United States Patent
Rokowski et al.

(10) Patent No.: US 9,499,712 B2
(45) Date of Patent: Nov. 22, 2016

(54) INFRARED REFLECTIVE CLEAR COATING COMPOSITIONS FOR ELASTOMERIC WALL AND ROOF COATINGS

(71) Applicants: Dow Global Technologies LLC, Midland, MI (US); Rohm and Haas Company, Philadelphia, PA (US)

(72) Inventors: Joseph M. Rokowski, Barto, PA (US); Beata A. Kilos, Midland, MI (US); Scott T. Matteucci, Midland, MI (US)

(73) Assignees: Rohm and Haas Company, Philadelphia, PA (US); Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/755,116

(22) Filed: Jun. 30, 2015

(65) Prior Publication Data
US 2016/0009938 A1    Jan. 14, 2016

Related U.S. Application Data

(60) Provisional application No. 62/023,298, filed on Jul. 11, 2014.

(51) Int. Cl.
| | | |
|---|---|---|
| *C09D 133/00* | (2006.01) | |
| *C08K 7/26* | (2006.01) | |
| *C09D 5/33* | (2006.01) | |
| *C09D 183/04* | (2006.01) | |
| *C09D 133/08* | (2006.01) | |
| *C09D 5/00* | (2006.01) | |
| *C09D 7/12* | (2006.01) | |

(52) U.S. Cl.
CPC ............ *C09D 133/00* (2013.01); *C08K 7/26* (2013.01); *C09D 5/00* (2013.01); *C09D 5/004* (2013.01); *C09D 7/1208* (2013.01); *C09D 133/08* (2013.01); *C09D 183/04* (2013.01)

(58) Field of Classification Search
CPC  C08K 3/003; C08K 3/36; C08K 2003/2227; C08K 7/24; C08K 7/26; C09D 133/00; C09D 133/08; C09D 133/10; C09D 5/00; C09D 5/004; C09D 7/1208; C09D 183/04; C09D 119/02
See application file for complete search history.

(56) References Cited

U.S. PATENT DOCUMENTS

| | | | |
|---|---|---|---|
| 5,911,963 A | * | 6/1999 | Krivak .................. C01B 33/193 423/335 |
| 7,768,602 B2 | | 8/2010 | LaFleur et al. |
| 2009/0241450 A1 | | 10/2009 | Italiane et al. |
| 2012/0100289 A1 | | 4/2012 | Egan et al. |
| 2013/0089706 A1 | | 4/2013 | Wen et al. |

FOREIGN PATENT DOCUMENTS

| | | |
|---|---|---|
| EP | 1735387 A2 | 12/2006 |
| EP | 2420868 A3 | 2/2012 |
| EP | 2586836 A1 | 5/2013 |
| JP | 2007177143 A | 7/2007 |
| WO | 2013065733 A1 | 5/2013 |

OTHER PUBLICATIONS

Kong et al., Advances in Elastomers I, 2013, Springer, p. 30.*

* cited by examiner

*Primary Examiner* — Satya Sastri
(74) *Attorney, Agent, or Firm* — Andrew E. C. Merriam

(57) ABSTRACT

The present invention provides compositions for use as elastomeric roof coatings having excellent infrared (IR) reflectivity which comprise (i) one or more elastomeric copolymer having a measured glass transition temperature (measured Tg) of from −100 to 0° C. and one or more mesoporous filler, preferably a mesoporous filler that is substantially free of organic groups or residues, the mesoporous filler chosen from mesoporous silica, mesoporous aluminosilicates and mesoporous alumina, wherein the composition has a pigment volume concentration (% PVC) of from 0.1 to 15%. Such compositions provide aqueous or solvent borne clearcoats that can go over existing, already painted or colorcoated roof or wall substrates to preserve their finish or appearance.

9 Claims, No Drawings

INFRARED REFLECTIVE CLEAR COATING COMPOSITIONS FOR ELASTOMERIC WALL AND ROOF COATINGS

The present invention relates to coating compositions for roof and wall coatings having excellent infrared reflecting properties comprising an elastomeric polymeric binder and a mesoporous filler, as well as to methods of using the compositions and coatings made thereby. More particularly, it relates to aqueous acrylic emulsion polymer or polysiloxane elastomeric roof coatings, the compositions having a pigment volume concentration (% PVC) of from 0.1 to 15% or, preferably, from 1 to 10%, and to coated wall and roof substrates made from such coating compositions.

Elastomeric roof coatings have recently become popular as an inexpensive solution for extending the life of many kinds of roofs, including roofs from organic materials, such as built up roofs, modified bitumen roofs and membranes, sprayed polyurethane foam roofs, thermoplastic polyolefin membranes, ethylene propylene diene rubber (EPDM) roofs, as well as aluminum and metal roofs and even tile roofs. White elastomeric roof coatings have been useful in reducing energy costs as they reflect heat off of roofs, especially in urban areas where the roofs before coating are often black or dark in color. Meanwhile, markets outside the US satisfy demand for deep tint and vivid colors which tend to fade or bleach over time.

White or light colored pigmented exterior coatings are applied to walls roofs, pavements, structures etc. to minimize heat gain by increasing solar reflectivity primarily through the use of conventional white opaque pigments such as titanium dioxide and zinc oxide and colored opaque pigments such as iron oxide. Such white pigments reflect visible light and infrared (IR) radiation, each of which account, respectively, for about 45% and 50% of total solar reflectance. However, white or colored opaque coatings are generally not used on steep slope shingled roofs because the opaque color does not provide color variation associated with the intricate granule design and placement of asphalt shingles. In addition, high IR reflective coatings are limited to white or light pastel colors. Deeptone colors have relatively high IR reflectance only when special IR reflective pigments are used. Such IR reflective pigments are limited in color selection and cannot be blended to match color hue without reducing the IR reflectance through interference reflectance of each color in the coating. Accordingly, only a very limited range of finishes are available for IR reflective roof and wall coatings.

Recently, U.S. patent publication 2013/0089706A1, to Wen et al. disclosed infrared reflective coatings comprising polymer and dispersed IR reflective clusters of titanium dioxide (TiO$_2$) primary particles cemented with plus precipitated silica and/or alumina. The IR reflective clusters are white pigments; see [0040]. The coatings were colorcoat compositions from white paint bases that were applied to metal coils and to roofing granules; however, each coating color had to be separately formulated; and no deep tint compositions were enabled.

There clear remains a need for coatings that enable a finish having any color or hue to reflect radiation in the IR wavelength range.

The present inventors have sought to solve the problem of providing effective infrared (IR) reflective roof and wall coating compositions that provide excellent infrared reflectance in coatings of any color on any substrate.

STATEMENT OF THE INVENTION

1. In accordance with the present invention, compositions for infrared reflecting roof and wall coatings comprise (i) one or more elastomeric polymer having a measured Tg of from −100 to 0° C., or, preferably, from −80 to −5° C., and (b) from 0.1 to 25 wt. %, or, preferably, from 0.25 to 15 wt. %, or, more preferably, from 1 to 10 wt. %, of one or more mesoporous filler chosen from mesoporous silica, mesoporous aluminosilicates and mesoporous alumina, the mesoporous filler preferably being substantially free of organic groups or residues, wherein the composition has a pigment volume concentration (% PVC) of from 0.1 to 15% or, preferably, from 0.5 to 10%.

2. The composition of 1, above, wherein the one or more polymer is chosen from aqueous acrylic emulsion copolymers, polysiloxanes, their mixtures and their combinations, preferably, two stage aqueous acrylic emulsion copolymers having a hard stage with a measured glass transition temperature (measured Tg) of 0° C. to 70° C. and a soft stage with a measured Tg of from −60 to 0° C., preferably, −10° C. to −40° C.

3. The composition of 1 or 2, above, wherein the one or more mesoporous filler is mesoporous silica.

4. The composition of 3, above, wherein the mesoporous silica has an average pore size of from 1 to 100 nm, or, preferably, from 2.5 nm to 50 nm, or, more preferably, from 3 to 40 nm, or, even more preferably, from 10 to 18 nm.

6. The composition of 1, 2, 3, 4, or 5 above, which composition is a clearcoat composition.

7. The composition of 1, 2, 3, 4 or 5 above, further comprising an IR reflective pigment, preferably, a complex inorganic pigment, such as a Cr—Fe pigment.

8. In another aspect of the present invention, methods of using the compositions of any of 1 to 7, above, comprise applying the composition to a painted substrate, a coated substrate, a roofing shingle or a roofing substrate and letting it dry.

9. In yet another aspect of the present invention, coated roofing or wall substrates comprise a roofing or wall substrate coated by the method of 8, above.

Unless otherwise indicated, all temperature and pressure units are room temperature and standard pressure (1 atmosphere).

All phrases comprising parentheses denote either or both of the included parenthetical matter and its absence. For example, the phrase "(meth)acrylate" includes, in the alternative, acrylate and methacrylate.

As used herein, the term "ASTM" refers to publications of ASTM International, West Conshohocken, Pa.

As used herein, the term "(meth)acrylate" means acrylate, methacrylate, and mixtures thereof and the term "(meth)acrylic" used herein means acrylic, methacrylic, and mixtures thereof.

As used herein, the term "pigment volume concentration" or % PVC refers to the quantity calculated by the following formula:

$$PVC\ (\%) = \frac{\text{volume of pigment(s)} + \text{volume of extender(s)} + \text{volume of filler(s)}}{\text{Total dry volume of coating}} \times 100$$

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "mesoporous filler" means refers to a porous oxide material composed of an oxide of silicon, aluminum, aluminosilicate, or combination thereof, wherein the filler has an average pore size of from 2 to 100 nm or, preferably, 2.5 nm to 50 nm calculated using $N_2$ adsorption and a BET calculation based on the $N_2$ adsorption/desorption isotherm. Such methods are disclosed in the article "Recommendations for the Characterization of Porous Solids", J. Rouquerol et al.; Pure & Appl. Chem., Vol. 66, No. 8; PP 1739-1758; 1994.

As used herein, the term "solids" or "total solids" means for an aqueous composition all parts of the aqueous compositions of the present invention except for water and volatiles or VOCs that would evaporate under conditions of ambient or outdoor application temperature and pressure (the "use conditions").

As used herein, the term "polymer solids" refers to the polymerized monomers, chain transfer agents and non-volatile surfactants in any emulsion (co)polymer.

As used herein, the term "measured glass transition temperature" or "measured Tg" refers to the glass transition temperature of a material as determined by Differential Scanning calorimetry (DSC) scanning from −90° C. to 150° C. at a rate of 20° C./min on a DSCQ2000 manufactured by TA Instrument, New Castle, Del. The Tg is the inflection point of the curve of heat flow vs. temperature or the maximum value on the plot of its derivative.

As used herein, the term "substantially free of organic groups or residues" means that a given material has 1000 ppm or less, or, preferably, 500 ppm or less of such organic groups or residues as determined by FTIR (where an Si—O—C bond is at 1032 cm-1) or NMR as is known in the art.

As used herein, unless otherwise specified, the term "weight average particle size" for any pigment, extender or filler refers to a particle size measured by light scattering using a BI-90 particle size analyzer (Brookhaven Instruments Corp. Holtsville, N.Y.) and taking the weight average of the particle size distribution.

As used herein, the term "weight average molecular weight" or "MW" refers to the weight average molecular weight of a polymer as measured by aqueous gel permeation chromatography (GPC) against a polyacrylic acid (PAA) standard of a copolymer that is hydrolyzed in KOH.

As used herein, the phrase "wt. %" stands for weight percent.

The compositions of the present invention enable the provision of a clear coating film having the ability to reflect infrared radiation and lower the temperature of coated surfaces which remain visibly transparent, thereby revealing the color, shading and surface contour of a shingle or other roofing, wall or pavement substrate below the clear coating. The coating compositions of the present invention form films with relatively high IR reflectivity and are universally applicable to any colored roof or substrate. Further, the present invention enables high levels of IR reflectivity without reformulation of each individual color coating that would otherwise incorporate IR reflective color pigments.

The compositions of the present invention enable coatings having a level of IR reflectivity as measured by ASTM C1549 (2002) ranging from 25% or more, or, preferably, 40% or more, or, more preferably, 50% or more.

The mesoporous filler of the present invention is a silica, an alumina or an aluminosilicate. Such mesoporous fillers may be made by sol-gel polymerization as is known in the art. For example, mesoporous fillers are made in an oil in water emulsion by dissolving in an acidic (~pH<3, preferably ≤2, or, more preferably, ≤1) aqueous solution a structure directing agent, such as an amphiphilic nonionic block copolymer, adding a polymer swelling agent, such as trialkyl benzene, heating the mixture, adding under shear an oxide precursor and heating and aging for 12 to 72 hours at a temperature of from 20 to 80° C., for example 35 to 60° C. to form the gel and, optionally, heating to a higher temperature (e.g., from 35 to 140° C., or, preferably, 60 to 110° C.) with or without a pore shaping agent for 11 to 36 hours out of the total aging time (12 to 72 hrs.) to make the gel, and then filtering and washing the precipitate in water and ethanol, optionally followed by calcining the product. Such methods are disclosed in detail in U.S. Pat. No. 6,592,764 B1 and U.S. Publication No. 2009/0047329, both to Stucky.

Suitable oxide precursors may include, for example, metal alkoxides, e.g., silicon alkoxides, like tetraethylorthosilicate (TEOS), tetramethylorthosilicate (TMOS) and aluminum alkoxides, like aluminum isopropoxide; silicates or aluminates such as sodium silicate, ammonium silicate and sodium aluminate; and silicon or metal halides, e.g., silicon chloride ($SiCl_4$). Preferably, oxide precursors are inorganic and include silicates and/or aluminates, such as sodium aluminate. Where the mesoporous filler is to include a combination of oxides, the ratios of the oxide precursors can be varied to provide a desired ratio of oxides in the final product.

Suitable amounts of the oxide precursors may range from about 1 to 25 wt. %, based on the total weight of the total reaction medium, including water and solvent. The weight ratio of total (one or more) oxide precursors to total (one or more) structure directing agents ranges from 4:5 to 20:1, or, preferably, 1:1 to 5:1.

Suitable structure directing agents for use in sol-gel mesoporous filler production of the present invention can be selected from a variety of polymers, block co-polymers, self-assembling polymers, nanoparticles, biologically active agents, and the like, according to the desired geometry of the final product. In one embodiment, the structure directing agents are amphiphilic polyoxyalkylenes and self-assembling block co-polymers such as the Pluronics™ P123™ 9 a triblock PEO-PPO-PEO polymer (5800 Da) or FI27™ (BASF, Leverkusen, Del.).

Suitable amounts of the structure directing agents range from about 0.5 to 10 wt. %, based on the total weight of the total reaction medium, including water and solvent.

Suitable polymer swelling agents are any which readily dissolve the structure directing agents and form an emulsion in water, for example, trimethyl benzene.

Suitable acids acting as catalysts may be inorganic acids, such as HCl or phosphoric acid, or carboxylic acids like formic or acetic acids, or malic acid.

Optionally, pore shaping agents can be used. Suitable pore shaping agents are fluoride salts, for example sodium, potassium, ammonium or tetraalkylammonium fluoride. Suitable amounts of the pore shaping agents range from about 0.1 to 2 wt. %, based on the total weight of the total reaction medium, including water and solvent.

The methods for making the mesoporous fillers of the present invention result in mesoporous silica and/or alumina that are substantially free of organic groups or residues, such as methyl or alkyl groups or hydrocarbon results. That the mesoporous fillers of the present invention are substantially free of organic groups or residues can be observed by using techniques such as NMR or FTIR in a manner that is readily known to those familiar with the art.

Where the oxide precursors of the present invention are themselves organic, e.g., tetraethyl orthosilicate, a mesoporous filler that is substantially free of organic groups or residues will result when the mesoporous filler is formed at a pH of ≤2, or combinations thereof.

The coating compositions of the present invention have a low % PVC to insure that they remain flexible in use. The mesoporous fillers may be present in the compositions of the present invention in the amount of from 0.5 to 25 wt. %, or, preferably, from 1 to 10 wt. %, based on the total solids of the composition. Higher loadings of the filler are possible in compositions comprising softer and more flexible lower glass transition temperature polymers.

Preferably, the compositions of the present invention are clearcoat compositions wherein the elastomeric polymer and the mesoporous filler have similar refractive indices in air which differ by less than 0.3, preferably, by less than 0.2, or, more preferably, less than 0.15.

Exceptionally high transparency in the coating or coating composition for use as a clearcoat is not necessary in the present invention as some turbidity is acceptable. In the case of emulsion copolymer compositions, turbidity is common in the wet polymer; however, emulsion copolymers formulated with solely the mesoporous filler of the present invention generally dry clear.

In compositions other than clearcoats where the mesoporous silica and or alumina are combined with IR Reflective color pigments, the present invention enables the provision of compositions for deeply colored or deep tint coatings having high (>25%, or, preferably, >40%) IR reflectivity.

Suitable IR reflective pigments include, for example, complex inorganic pigments containing oxies of two or more metals, such as Cr—Fe pigments. An example of a suitable IR reflective color pigment includes, for example, Cool Color™ or Eclipse™ IR reflective pigments from Ferro (Cleveland, Ohio) or Ferro Green 24-10204 (Ferro, Cleveland, Ohio) or any pigment or colorant having a refractive index in air of 1.7 or more that reflects light in the infrared wavelength regions of 0.7 to 2.5 microns.

Acrylic emulsion copolymers suitable as the elastomeric polymers of the present invention are well known in the art. Such emulsion copolymers comprise the emulsion copolymerization product of one or more soft vinyl or acrylic monomer, such as butyl acrylate, ethylhexyl acrylate or lauryl methacrylate, with from 0.1 to 5 wt. %, based on the weight of all monomers used to make the emulsion copolymer, of at least one addition polymerizable carboxylic acid monomer, such as methacrylic acid, and, as needed, with harder vinyl or acrylic monomers such as styrene, acrylonitrile and methyl methacrylate. As is known in the art, the monomer mixture is selected to give a desired calculated Tg.

Preferably, to improve weatherability in coatings comprising them, the emulsion copolymer of the present invention comprises the copolymerization product of a monomer mixture that contains no styrene or vinyl aromatic monomer.

Suitable vinyl or acrylic monomers (a) for use in the soft monomer composition may include, for example, butyl acrylate, ethyl acrylate, methyl acrylate, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{18}$) alkyl methacrylates, cyclohexyl acrylate and cyclohexyl methacrylate.

To improve stability in aqueous systems, the elastomeric emulsion polymers of the present invention include acid functionality. Suitable ethylenically unsaturated acid functional monomers are included in the feed of the soft monomer composition and may include addition polymerizable carboxylic acids, salts thereof, anhydrides thereof, and phosphorous containing or sulfur containing acid functional monomers. Examples of suitable acid monomers may include, for example, maleic acid or anhydride, phosphoalkyl (meth)acrylate, meth)acrylamidopropane sulfonate and, preferably, methacrylic acid (MAA), acrylic acid (AA) and itaconic acid.

Preferably, to prevent weatherability or outdoor durability problems, the amount of vinyl aromatic monomers should range 19.5 wt. % or less or, preferably, 10 wt. % or less, or, more preferably, 5 wt. % or less, based on the total weight of monomers used to make each of the emulsion copolymers.

Preferably, to increase the mechanical properties made from the aqueous elastomeric polymer compositions of the present invention, the emulsion copolymers comprise the copolymerized product of a (meth)acrylonitrile in the amount of 11 wt. % or less or, preferably, 8 wt. % or less, based on the total weight of monomers used to make each of the emulsion copolymers.

Adhesion promoter monomers such as hydrolysable silane functional (meth)acrylates, such as (meth)acryloyloxypropyl trialkoxy silanes, and ureido (meth)acrylates may be included in the soft vinyl or acrylic monomer composition. Suitable amounts of such adhesion promoter monomers may range from 0 to 5 wt. %, based on the total weight of monomers used to make the emulsion copolymers, or, preferably, 0.1 to 4 wt. %.

Elastomeric acrylic emulsion copolymers can be polymerized by emulsion polymerization techniques well known in the art, e.g., by aqueous polymerization in the presence of an initiator and one or more surfactant.

Elastomeric acrylic emulsion copolymers useful in the present invention are readily formed as is known in the art by methods for making emulsion copolymers from hydrophobic monomers, which are mostly but not all soft acrylic monomers (a) suitable for use in the present invention. For example, U.S. Pat. No. 5,521,266, to Lau, discloses suitable polymerization processes suitable for forming emulsion copolymers made from one or more hydrophobic monomer. For example, the hydrophobic monomer can be complexed with a macromolecular organic compound having a hydrophobic cavity by mixing them to form a complexed mixture, and charging the complexed mixture, along with any other monomers to a reaction vessel. Alternatively, a macromolecular organic compound having a hydrophobic cavity may be added to the reaction vessel before, during or after the monomer mixture has been charged. Suitable macromolecular organic compounds having a hydrophobic cavity may include, for example, cyclodextrin and cyclodextrin derivatives; cyclic oligo saccharides having a hydrophobic cavity such as cycloinulohexose, cycloinuloheptose, and cycloinuloctose; calyxarenes; and cavitands. The ratio of soft acrylic monomer to the macromolecular organic compound having a hydrophobic cavity may range from 1:5 to 5000:1, preferably 1:1 to 1000:1.

To improve blister resistance and adhesion, suitable elastomeric emulsion copolymers useful in the present invention have a weight average molecular weight of from 10,000 to 750,000, preferably, from 50,000 to 500,000. Such emulsion copolymers may be made by conventional methods, such as, for example, including in the polymerization a wide variety of chain transfer agents. These include, for example, alkyl mercaptans, halogen compounds, and other well-known agents. A chain transfer agent such as, for example, n-dodecylmercaptan may be used in amounts ranging from 0.1 wt. %, based on the weight of total monomers used to make the emulsion copolymer, to 2.0 wt. %, or preferably, 0.2 to 1.0 wt. %, or, more preferably, 0.25 to 0.8 wt. %. Preferably, the chain transfer agent is hydrophobic, such as n-dodecyl mercaptan (n-DDM or DDM) or any $C_4$ to $C_{18}$ mercaptan.

Suitable emulsion copolymers for use as elastomeric polymers may be made by gradual aqueous emulsion addition polymerization in one or more stages, as is conventional in the art. Single stage and multistage emulsion copolymers are equally suitable for making IR reflective coatings and films. Preferably, for the purpose of lowering tack in coatings made from clearcoat compositions or any other composition having a % PVC of 20% or less, the elastomeric polymer of the present invention comprises two stage aqueous acrylic emulsion copolymers having a hard stage with a measured glass transition temperature (measured Tg) of 0° C. to 70° C. and a soft stage with a measured Tg of from −60 to 0° C., preferably, −10° C. to −40° C.

For multistage or two stage aqueous acrylic emulsion copolymers the overall measured Tg is within the range of the inventive elastomeric polymer (−100 to 0° C.) if the weighted average of the measured Tgs for each of the respective polymer stages is within the inventive range; so, for example, a two-stage polymer comprising 50 wt. % of one stage having a measured Tg of −80° C. and 50 wt. % one stage having a measured Tg of 20° C., would be reported as having an overall measured Tg of −30° C.

Suitable siloxane polymers useful as elastomeric polymers in the present invention are well known in the art and include polysiloxanes, such as polydimethylsiloxanes, and copolymerization products thereof with hydrolysable silane functional acrylic monomers which can also be polymerized into acrylic emulsion copolymers to form hybrid polymers. Siloxane polymers are generally formulated as solvent borne coatings in organic solvents, such as glycol alkyl ethers. The hybrid polymers may generally be formulated as emulsion copolymers using surfactants, such as nonionic surfactants.

A suitable example of a siloxane polymer useful in the present invention is Geniosil™ WP-1 or WP-2 (Wacker Chemie AG, Munchen, Del.).

To better enable effective let down of the elastomeric polymer onto mesoporous fillers and IR reflective pigments, the compositions of the present invention preferably comprise one or more dispersant, e.g., a hydrophilic dispersant, such as a polyMAA or a polyacid salt, e.g., alkali(ne) metal salt, for example, polyMAA, its Na salt. Any dispersant that can stabilize the pigments, and/or fillers and wet out substrate surface in use may be used. Suitable dispersants include both hydrophobic and hydrophilic dispersants, and are, preferably, hydrophilic dispersants.

Hydrophilic dispersants contain the polymerization product of less than 30 wt. %, preferably 20 wt. % or less of monomers other than hydrophilic monomers like alkyl (meth)acrylates, dienes or olefins, based on the total weight of monomers used to make the copolymer. More preferred hydrophilic surfactants have a weight average molecular weight of 5,000 or more, preferably 8,500 or more. Hydrophobic dispersants include emulsion copolymer dispersants or block copolymer dispersants comprising more than 20 wt. %, based on the total weight of copolymerized monomers, of any block of polymer that would not form a water soluble homopolymer (≥50 g/L dissolves at room temp upon simple mixing) at the weight average molecular weight of the dispersant block in use. Thus, if a block of a monomer in a block copolymer has a weight average molecular weight of 1,000 in the dispersant, then to determine if the dispersant is hydrophobic, a homopolymer having a weight average molecular weight of 1,000 of the same monomer used to make the block in the dispersant would be evaluated to see if it is water soluble.

Suitable hydrophilic dispersants may include, for example, copolymer dispersants like Tamol™ 851 (Na poly (MAA)) or 1124 (poly(AAco-hydroxypropyl acrylate)) dispersants (Dow Chemical, Midland, Mich.), or Rhodoline™ 286N dispersants (Rhodia, Cranberry, N.J.), Disponil™ Fes-77, a fatty alcohol polyglycol ether sulfate available from (Cognis, Cincinnati, Ohio) polybasic acid salts, such as potassium tripolyphosphate (KTPP), polycarboxylic acid salts, copolymer acid salts, alkali soluble resin salts, phospho ethyl methacrylate (PEM) polymer and copolymer dispersants, mono or oligo-phosphorous or sulfur containing acid salts, which can be organic or inorganic, e.g., KTPP or sulfonates. To avoid excessive water sensitivity, and possible loss of adhesion, any dispersants should be used in amounts of 2 wt. % or less, based on the total polymer solids in the compositions.

The compositions of the present invention may additionally comprise one or more of thickeners, such as hydroxyethylcellulose (HEC) or modified versions thereof, UV absorbers, surfactants, coalescents, wetting agents, thickeners, rheology modifiers, drying retarders, plasticizers, biocides, mildewicides, defoamers, colorants, and waxes.

To insure enhanced weatherability, the compositions of the present invention may preferably include one or more UV absorber or light stabilizer, such as benzophenone (BZP), or butylated hydroxytoluene (BHT) or hindered amines in the total amount of from 0 to 1 wt. %, based on the total solids of the composition, preferably, 0.05 wt. % or more or up to 0.5 wt. %.

Preferably, improved adhesion is observed in coatings made from compositions comprising one or more hydrolysable silanes or alkoxy silanes, which preferably have two or three hydrolysable groups. Suitable amounts of epoxysilane, aminosilane, vinyl alkoxysilane are the same. Combinations of the epoxysilanes and aminosilanes may be used.

Suitable aminosilanes may comprises an amino-alkyl functional group and is hydrolysable, having, for example, one or more alkoxy group or aryl(alkyl)oxy functional group. Preferably, the amino silane has two or more amino functional groups and two or, more preferably, three hydrolysable groups, i.e., tri-alkoxy.

Examples of suitable aminosilanes include Momentive™ Silquest™A-1120 (Momentive Performance Materials, Albany, N.Y.) or Dow-Corning Z-6020 (Dow Corning, Midland, Mich.), each of which are aminoethylaminopropyl trimethoxysilanes. Other suitable silanes include, for example, Dow Corning Z-6040, which is glycidoxypropy trimethoxysilane, and Silquest Wetlink™ 78, (Momentive Performance Materials, Albany, N.Y.), a glycidoxypropylmethyl diethoxysilane.

Silanes may be used in amounts ranging from 0.2 wt. % or more, or up to 2.0 wt. %, preferably, 0.5 wt. % or more, or, preferably 1.5 wt. % or less, or, more preferably, 0.7 wt. % or more, based on the total weight of emulsion copolymer solids.

The aqueous compositions of the present invention may be prepared by mixing the elastomeric binder with conventional components in high speed dispersion equipment such as a Cowles disperser, or a Sigma mill for caulks and sealants.

To formulate the aqueous compositions of the present invention with a silane, the silane can be added with stirring, such as overhead stirring, preferably before pigments or fillers are added.

The solids level of aqueous coating compositions of the present invention may range 40 wt. % or higher and up to 80 wt. %, preferably, 50 to 70 wt. %, based on the total weight of the compositions.

In another aspect, the present invention provides methods of using the compositions of the present invention comprising applying the coating compositions of the present invention to a substrate, followed by drying, e.g., at ambient temperature and humidity or at elevated temperature and ambient humidity. Drying can comprise, for example, ambient drying.

The compositions of the present invention can be used on any weatherable substrate, such as a roof or a wall, with suitable substrates being asphaltic coatings, roofing felts, synthetic polymer membranes; modified bitumen membranes; foamed polyurethane, such as, spray polyurethane foam; metals, such as aluminum; previously painted, primed, undercoated, worn, or weathered substrates, such as metal roofs, weathered thermoplastic polyolefin (TPO), weathered poly(vinyl chloride) (PVC), weathered silicone rubber and weathered EPDM rubber. Less preferred roofing substrates may include cementitious substrates and previously painted cementitious substrates.

The compositions are preferably used as topcoats or topcoat maintenance coatings, especially if formulated with UV absorbers or light stabilizers, or can be used as the basecoat or maintenance basecoats in two coat systems, e.g., with a topcoat or mastic.

EXAMPLES

The following Examples illustrate the advantages of the present invention. Unless otherwise indicated, all conditions of temperature are room temperature (22-24° C.) and all units of pressure are 1 atmosphere.

Test Methods:

The following test methods are used in the Examples.

Clarity:

The transparency of a given coating is measured by visual inspection of the coating film, with a subjective 1-10 scale. An acceptable clarity rating is 8 or more, or, preferably, 9 to 10 (window glass clear). Haze: Coatings are visually inspected for haze, with a subjective 1-10 scale, 10=best. Acceptable is 8 or higher.

IR Reflectivity:

Measured in accordance with ASTM C1549 (2002), this is the reflected incident light from a given coating or film in the wavelength region 0.7 to 2.5 microns as measured by a solar reflectometer (model no. SSR-ER, Devices and Services Co., Dallas, Tex.) calibrated according to manufacturer's instructions. IR radiation is a fraction of both the wavelength region of visible light and of solar reflectance. Range measured is from 0 to 1.0, with full reflectance at 1.0 and acceptable readings of 0.25 or higher. Where a given material is coated on a base film, such as a polyester film, the IR Reflectivity of the base film is measured separately before coating application and the measured reflectivity is subtracted from the value measured for the coated base film.

Solar Reflectance:

Measured in accordance with ASTM C1549 (2002), this is the fraction of the incident solar energy which is reflected by a given substrate or film in the wavelength range of 0.30 to 2.5 microns which includes some IR radiation some ultraviolet (UV) radiation. It is measured by a solar reflectometer (model no. SSR-ER, Devices and Services Co., Dallas, Tex.) calibrated according to manufacturer's instructions. Range measured is from 0 to 1.0, with full reflectance at 1.0 and acceptable readings above 0.25. Where a given material is coated on a base film, such as a polyester film, the Solar Reflectance of the base film is measured separately before coating application and the measured reflectivity is subtracted from the value measured for the coated base film.

In the Examples that follow, the following chemical abbreviations are used: BA: Butyl acrylate; BZP: Benzophenone; MMA: Methyl methacrylate; AA: Acrylic acid; MAA: Methacrylic acid; EHA: Ethyl hexyl acrylate; IA: Itaconic acid; UMA: Ethylene ureido ethyl methacrylate; n-DDM: n-dodecyl mercaptan.

In the IR Reflectivity Examples in Tables 1 and 2, below, and in the Solar Reflectance Examples in Table 3, below, coating films of the indicated coating material were cast on clear Mylar™ polyester (DuPont, Wilmington, Del.) films using a Gardner Block Multiple Clearance square applicator (Paul N. Gardner Company Inc., Pompano Beach, Fla.) and dried to give coatings having the indicated film thickness of 625 to 700 microns (25-28 mils).

The elastomeric polymer used in Examples 1 to 4, below was a two-stage aqueous acrylic emulsion copolymer (Acrylic Emulsion Copolymer 1) having a 55 wt. % solids content and 85 wt. % of a soft stage and 15 wt. % of a hard stage, an overall copolymerized acid monomer content of 2.36 wt. %, based on the total weight of monomers used to make the copolymer, and an overall measured Tg of −35° C.

The mesoporous silica used in the examples below has an average pore size of 13-14 nm and is substantially free of organic groups.

TABLE 1

IR Reflectivity Values for Acrylic Films
(film thickness of 625 to 700 microns (25-28 mils))

| Example | IR Reflectivity |
|---|---|
| 1* Acrylic Emulsion Copolymer 1 | 4% (0.04) |
| 2* Acrylic Emulsion Copolymer 1 (30 wt. %) + Ion Exchange Resin (crosslinked vinyl copolymer bead) (70 wt. %) | 40% (0.4) |
| 3 Acrylic Emulsion Copolymer 1 (30 wt. %) + mesoporous silica (70 wt. %) | 70% (0.7) |

*Comparative Example

As shown in Table 1, above, the inventive mesoporous silica provides coating compositions having greatly enhanced IR Reflectivity.

TABLE 2

IR Reflectivity of Various Materials at 10 wt. % loading in Acrylic Emulsion Copolymer (90 wt. % acrylic emulsion copolymer 1)

| Example | IR Reflectivity 254 micron Film Thickness | Clarity 10 = best |
|---|---|---|
| 1A* AdNano ™ Zinc[1] | 0.14 | 9 |
| 2A* Zeelan Z-Light ™ Spheres W-1000[2] | 0.19 | 8-9 |
| 3A* Cabot Nanogel ™,[3] TLD 201 | 0.28 | 7 |
| 4A* Expancel ™,[4] 461 DE 20d70 | 0.48 | 6 |
| 5A* Degussa EXP ™,[5] 3300 Silica flatting agent | 0.12 | 10 |
| 6A* Potters[6] 60P18 Glass Bead | 0.318 | 8 (grainy) |
| 4 Mesoporous Silica | 0.337 | 8 (smooth) |

TABLE 2-continued

IR Reflectivity of Various Materials at 10 wt. % loading in Acrylic Emulsion Copolymer (90 wt. % acrylic emulsion copolymer 1)

| Example | IR Reflectivity 254 micron Film Thickness | Clarity 10 = best |
|---|---|---|

[1] Zinc oxide (Evonik Industries AG, Essen DE; mfg given particle size: 100-170 nm);
[2] Ceramic (Alkali Alumino Silicate) microsphere (Zeelan Industries, 3M, St. Paul, MN, mfg. particle size = 15-25 microns;
[3] Hydrophobically treated amorphous silica (Cabot Corporation, Billerica, MA);
[4] Polymeric beads (CAS # 25214-39-5) isobutene gas filled (Akzo Nobel, Sundsvall, Sweden);
[5] Pyrogenic, polysiloxane surface modified silica, mfg. particle size = 9 microns (Evonik);
[6] Fused glass, mfg. particle size = 16-20 microns (Potters Industries, Malvern, PA);
*Comparative Example.

As shown in Tables 1 and 2, above, the mesoporous filler of the present invention provides excellent IR reflectivity at both lower and higher loadings. In addition, the mesoporous filler of the present invention enables acceptable clarity in a coating so that a user can retain the color or look of the clearcoated substrate. In comparison the Example 3A silica, which is mesoporous contains organic material, gives nearly 20% lower IR reflectivity and inferior coating clarity in comparison to the present invention.

TABLE 3

Solar Reflectance vs. Level of MPS and Film Thickness

| Mesoporous Silica Wt. % in emulsion copolymer | Solar Reflectance at Wet Coating Thickness | | | |
|---|---|---|---|---|
| | 12.7 μm (5 mil) | 25.4 μm (10 mil) | 50.8 μm (20 mil) | 101.6 μm (40 mil) |
| 20 | 0.4 | 0.49 | 0.63 | 0.73 |
| 15 | 0.35 | 0.42 | 0.56 | 0.66 |
| 10** | NA | 0.337 | 0.475 | 0.501 |
| 5 | 0.317 | 0.412 | 0.523 | 0.635 |

As shown in Table 3, above, the mesoporous silica filler of the present invention provides more than 30% (0.3) solar reflectance at low loadings and in a fairly thin film. Even at low loadings with thicker films, the mesoporous filler of the present invention provides excellent solar reflectance above 50%.

We claim:

1. A composition useful in an infrared reflecting wall or roof coating comprising (i) one or more elastomeric polymer having a measured glass transition temperature (measured Tg) of from −100 to 0° C. and chosen from aqueous acrylic emulsion copolymers, polysiloxanes, and their combinations, and (b) from 0.1 to 25 wt. % of one or more mesoporous filler chosen from mesoporous silica, mesoporous aluminosilicates and mesoporous alumina, wherein the composition has a pigment volume concentration (% PVC) of from 0.1 to 15%.

2. The composition as claimed in claim 1, wherein the elastomeric polymer has a measured Tg of from −80 to −5° C.

3. The composition as claimed in claim 1, wherein the one or more mesoporous filler is mesoporous silica.

4. The composition as claimed in claim 3, wherein the mesoporous silica has an average pore size of from 1 to 100 nm.

5. The composition as claimed in claim 4, wherein the mesoporous silica has an average pore size of from 2.5 nm to 50 nm.

6. The composition as claimed in claim 1, wherein the mesoporous filler is substantially free of organic groups or residues.

7. The composition as claimed in claim 1, which composition is a clearcoat composition.

8. The composition as claimed in claim 1, further comprising an IR reflective pigment.

9. A method of using the composition as claimed in claim 1, comprising applying the composition to a painted substrate, a coated substrate, a roofing shingle or a roofing substrate, and letting it dry.

* * * * *